Jan. 11, 1927.

P. M. BURMAN 1,613,930

FOLDING STAND

Filed March 8, 1926

INVENTOR
Peter M. Burman
BY
Frank Warren
ATTORNEY

Patented Jan. 11, 1927.

1,613,930

UNITED STATES PATENT OFFICE.

PETER M. BURMAN, OF SEATTLE, WASHINGTON.

FOLDING STAND.

Application filed March 8, 1926. Serial No. 93,104.

My invention relates to new and useful improvements in foldable and portable Christmas tree stands and the object of my invention is to provide a stand that is adapted to support a tree and the like and which can be readily opened in a manner to receive and support a tree and can thereafter be closed to occupy a comparatively small space.

Further objects are to provide a tree stand that is inexpensive to manufacture by reason that it can be made from standard metal strips in such a manner as to permit the strips to be pivotally connected together by suitable rivets or bolts and when so constructed the stand will accommodate different sizes of trees and so as to hold the butt end of the tree above the ground or floor upon which the stand is set.

With the above and other objects in view my invention consists in the novel construction, arrangement and combination of parts shown in the accompanying drawings, wherein—

Figure 1:
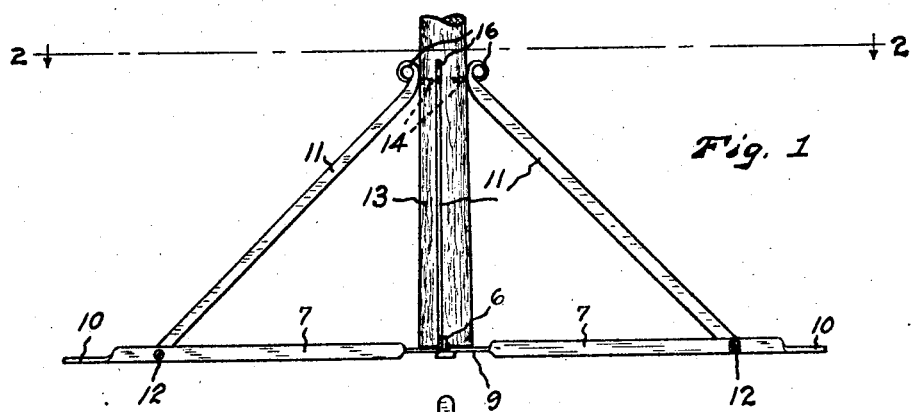
Figure 1 is a view in elevation of a stand constructed in accordance with my invention as it may appear when extended and supporting a tree, a fragment only of the tree being shown.

Referring to the drawings, throughout which like reference numerals indicate like parts, 6 and 7 designate two base members or bars arranged crosswise of each other and secured together substantially midway between their two ends by a normally vertical pivot member 8 that extends through pivot portions 9 formed in said base members by bending or twisting the same through an angle of ninety degrees relative to the main portions of the base bars. The extreme ends of the bars 6 and 7 are also bent or twisted through an angle of ninety degrees to form foot portions 10 that may rest upon any flat surface on which the stand is placed.

Figure 2:
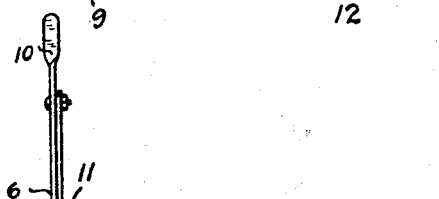
Fig. 2 is a plan view of the same on broken line 2, 2 of Fig. 1.
Figure 3:
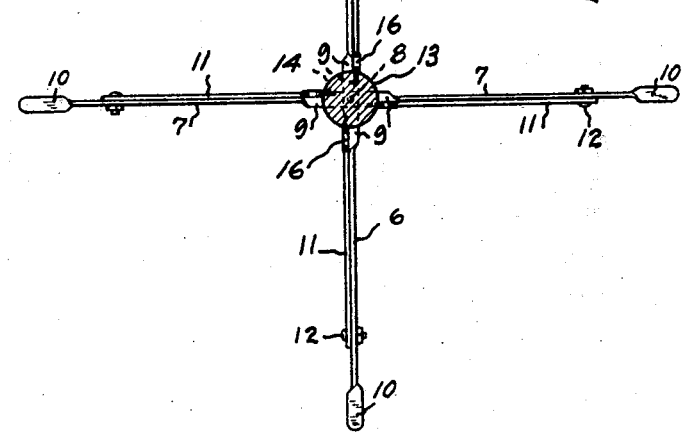
Fig. 3 is a view in elevation of the stand as it may appear when folded.
Figure 4:
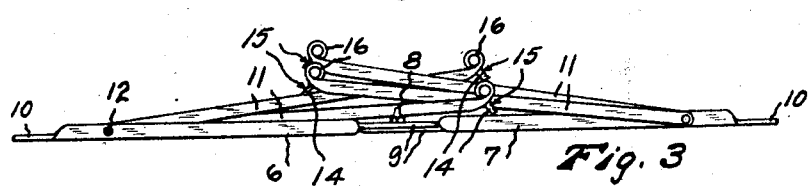
Fig. 4 is a plan view of the stand as it may appear when folded.

11 indicates brace members each having its outer end secured by a pivot member 12 to one of the bars 6 and 7 near the outer end thereof so that said brace members may be raised into an inclined position to engage with a tree or post 13 as shown in Figs. 1 and 2 or may be folded into a compact and out of the way position as shown in Figs. 3 and 4 when the stand is not in use. The length of each brace 10 is necessarily greater than the distance from its outer pivot 12 to the medial pivot 8 of the base members so that the brace may assume an incline varying from about 30 degrees to about 45 degrees relative to the vertical when in use.

The braces 10 are each provided on their upper end with an inwardly directed prong 14 that is relatively thin and knife-like and that is adapted to be forced into the tree 13 with its greatest dimension lengthwise of the grain of the wood. Notches 15 are preferably provided in the edges of the prongs 14 to cause them to bind more firmly in the tree 13 into which they are driven.

The upper ends of the braces 10 are bent outwardly and downwardly to form circular loops 16 on said top ends which loops constitute anvil portions on which blows may be delivered as with a hammer to drive the prongs 14 into a tree 13.

The medial pivot member 8 may extend above the portions 9 of the base members and form a center spike on which the bottom of the tree may rest for preventing sidewise movement of said bottom of the tree.

In bending the pivot portions 9 and the foot portions 10 the same are bent so that they will rest flatly on the floor when the stand is extended.

When the stand is not in use it may be folded as shown in Figs. 3 and 4 making a compact and convenient package for storage and shipment. When the stand is to be used the bar members are turned at substantially right angles to each other, the brace members are swung upwardly and outwardly, the post or tree is placed squarely over the central pivot and adjusted into the desired vertical position and the braces are then swung inwardly and the prongs driven into the tree. The braces are self adjusting to trees or posts of different diameters and shape. The stand may be quickly and easily set up and is as quickly and as easily taken down.

The foregoing description and accompanying drawings clearly disclose a preferred embodiment of my invention but it will be understood that changes may be made in the same without departing from the spirit and scope of the following claim.

What I claim is:

A folding stand for supporting a post in an upright position, embodying two base members formed of flat metal bars, each having a quarter twist at their ends to form foot portions and a quarter twist medially of their length to form horizontal pivot portions, the major portions of said bars being vertical, a vertical pivot member extending through said flat medial pivot portions, the upper end of said pivot member forming a spike whereon a post may rest, braces pivotally secured near the ends of said base members and adapted to extend inwardly and upwardly, and prongs on the inner ends of said braces arranged to be driven into said post to support the safe.

In witness whereof, I hereunto subscribe my name this 1st day of March, A. D. 1926.

PETER M. BURMAN.